United States Patent [19]

Zansky

[11] Patent Number: 4,837,495
[45] Date of Patent: Jun. 6, 1989

[54] CURRENT MODE CONVERTER WITH CONTROLLED SLOPE COMPENSATION

[75] Inventor: Zoltan Zansky, Menlo Park, Calif.

[73] Assignee: Astec U.S.A. (HK) Limited, Santa Clara, Calif.

[21] Appl. No.: 108,170

[22] Filed: Oct. 13, 1987

[51] Int. Cl.$^4$ .................... G05F 1/46; H02M 3/335
[52] U.S. Cl. .................... 323/222; 323/285; 363/21
[58] Field of Search .................. 363/20, 21, 97; 323/282, 283, 284, 285, 222, 299

[56] References Cited

U.S. PATENT DOCUMENTS

| | | | |
|---|---|---|---|
| 4,002,963 | 1/1977 | Hunter | 363/41 |
| 4,150,424 | 4/1979 | Nuechterlein | 363/97 |
| 4,386,311 | 5/1983 | Bafaro | 363/21 |
| 4,672,518 | 6/1987 | Murdock | 323/285 |
| 4,674,020 | 6/1987 | Hill | 323/222 |
| 4,683,528 | 7/1987 | Snow et al. | 363/21 |

Primary Examiner—Peter S. Wong
Attorney, Agent, or Firm—Fitch, Even, Tabin & Flannery

[57] ABSTRACT

A current mode converter with continuously variable optimized slope compensation and improved power factor is disclosed. In the slope compensation circuit, the output voltage of the converter is sensed and a ramp signal is generated with a slope that is determined by the loading of the converter. The ramp signal is combined with a conventional sensed current signal of the converter to generate a composite sensed current signal which is coupled to the comparator of the converter. The other input to the comparator is a conventional error amplifier and the comparator's output is used to control switching of the converter. In an alternate embodiment, the continuously variable slope compensation circuit is operative using an un-filtered full-wave rectified input voltage waveform. An output is produced for the comparator which is the multiplied product of this input voltage and the output of the converter's error amplifier thereby amplitude-modulating the error signal and providing a composite error voltage that will always be proportional to the unsmoothed input voltage waveform.

18 Claims, 6 Drawing Sheets

CURRENT MODE CONVERTER WITH CONTROLLED SLOPE COMPENSATION

FIELD OF THE INVENTION

This invention relates to the field of DC-DC converters and specifically to a method and means for improving the stability and power factor of a current mode converter.

BACKGROUND OF THE INVENTION

Current mode converters are a well known type of switching power supply which provide efficient operation over a wide range of operating conditions. These converters may be designed in either a voltage step-up (boost) or voltage step-down (buck) configuration.

In a typical voltage mode boost converter, an inductor is placed between a power supply and the drain of a switching transistor. A diode is coupled between the common inductor/drain terminal and the output of the converter. As the switching transistor is turned on and off under the control of a pulse width modulator, the inductor is energized with a current which flows through the inductor and switching transistor to ground, thus storing energy in the core of the inductor in the form of a magnetic flux. When the switching transistor is turned off, current continues to flow through the inductor. As the magnetic flux field collapses, a voltage appears across the inductor which is delivered through a diode to the load. Typically, a large capacitor is placed across the output of the converter to hold the converter output voltage at a predetermined level during the periods when the switching transistor is charging the inductor. In a voltage controlled converter, the voltage appearing at the load is sensed by an error amplifier through a voltage divider network. The error amplifier generates an error voltage which is related to the voltage appearing at the output of the converter. Minute changes in voltage appearing at the output of the converter are changed to relatively larger voltage swings by the error amplifier. The output of the error amplifier is coupled to one terminal of a comparator which has another terminal coupled to a fixed frequency ramp signal. As the voltage appearing at the output of the error amplifier rises and falls with respect to the ramp signal voltage, the output of the comparator changes state in a pulse-width modulated waveform. This signal is coupled to the switching transistor to effect the switching thereof and complete the regulator loop.

In a current mode converter, a peak current detection scheme is employed in the generation of the pulse width modulated control signal. Specifically, a sensing resistor is placed in series with the switching transistor and inductor. The series resistor senses the current flow in the inductor. The switching transistor is typically controlled by a flip/flop which is set to provide a high output by a clock signal having a predetermined frequency. Whenever the output of the flip-flop is high, the switching transistor turns on. When the switching transistor is turned on, current flow will begin to build in the inductor and the switching transistor. The voltage appearing across the current sensing resistor is coupled to a comparator which detects a predetermined voltage level. As the voltage appearing across the sensing resistor rises above the predetermined voltage level, the output of the comparator changes state and resets the flip/flop, thereby turning off the switching transistor until the next clock cycle. Thus, in a current mode converter, the inductor charging cycle is initiated by a fixed frequency clock signal and is terminated once the peak inductor current reaches a predetermined level. The rate at which the current flow changes during an inductor charging cycle is referred to as the slope of the current waveform.

Current mode converters offer several advantages over voltage mode converters. Current mode converters offer a simple topology. Since the inductor is switched on and off based on peak inductor current flow, the need for a separate pulse width modulator circuit is eliminated. Furthermore, the transient response of the current mode converter is much improved.

While the current mode converter offers many advantages, it has certain disadvantages. These disadvantages are discussed in B. Holland, Modeling, Analysis and Compensation Of The Current Mode Converter, Powercon II Proceedings, paper I-2, 1984. Holland and others have demonstrated that current mode converters exhibit the problems of open-loop instability above 50% duty cycle, less than ideal loop response caused by peak rather than loop sensing, and a tendency toward subharmonic oscillation and noise sensitivity, particularly when inductor current is small.

Holland has demonstrated that many of these problems may be significantly reduced by adding slope compensation to the sensed current waveform. Holland has demonstrated that the slope of the compensation ramp must be greater than one-half of the down slope of the current waveform. Thus, for a buck regulator, where the down slope is a constant equal to $R_s$ (VO/L) the amplitude (A) of the slope compensation should be chosen such that $$A > T \cdot R_s (VO/L)$$

to guarantee stability above a 50% duty cycle where:
  $V_O$ = voltage at the output of the converter
  T = converter switch period
  $R_s$ = current sense resistor resistance
  L = inductance in mH of the inductor While this technique renders the converter stable under all load conditions, the linearity and transient response of the converter will be severely degraded at light loads.

One technique for improving the performance of a current mode converter is discussed in U.S. Pat. No. 4,672,518, invented by Murdock, and incorporated herein by reference. This patent discloses a technique wherein a fixed slope ramp signal is summed with the sensed current waveform for slope compensation at light loads. Under heavy loads, the compensation signal is disabled or switched to a second reduced fixed slope. While this technique recognizes that a compensating ramp signal optimized for one mode of operation may not be suitable for another mode of operation, only two levels of fixed slope compensation are provided.

While Holland and Murdock have demonstrated that slope compensation will improve the performance of a current mode converter, all known slope compensation techniques employ fixed slope compensation. That is, the sensed current waveform is summed with a ramp signal having a fixed slope and the resultant signal is coupled to the comparator which controls the flip/flop and switching transistor. No technique is known which provides only the required amount of slope compensation for present operating conditions.

Furthermore, known slope compensation techniques are based on circuits which are operated from highly filtered DC power sources. Fixed slope compensation is not useful in circuits which are powered by a source of unfiltered power, for example the unfiltered output of a rectifier bridge. In this case, the power supply varies sinusoidally between zero volts and the power supply voltage. As the input voltage varies, the amount of required slope compensation also varies. In a fixed slope compensation system, a variable input voltage results in distortion in the sinusoidal envelope of the average current in the inductor. Further, circuits requiring a smooth DC input voltage generally employ a large electrolytic filter capacitor which causes poor line input power factor and are known to be unreliable. The present invention eliminates the need for this capacitor, thus improving the input line power factor and reliability over prior converters.

Finally, prior teachings have not addressed the problem of the effect of slope compensation on power factor. Fixed slope compensation causes poor power factor at light loads and high line voltages. In situations where the power factor of the converter is critical, known current mode converters are not suitable since the power factor of these circuits will change as the input voltage to the circuit changes. No prior technique is known which allows a current mode converter to incorporate a controlled variable slope compensation in a circuit which operates from an unfiltered or partially filtered power source while maintaining a nearly perfect power factor.

SUMMARY OF THE INVENTION

Briefly described, in one aspect of the present invention a current mode converter with variable slope compensation is provided. The present invention modifies a conventional current mode converter by incorporating a variable slope compensation circuit which senses the output of the current mode converter and generates a ramp signal whose slope is determined by the present loading of the converter. This variable slope ramp signal is combined with a sensed current signal to generate a slope compensated sensed current signal which is coupled to the comparator of the current mode converter.

Another aspect the present invention provides a slope compensated current mode converter having a nearly perfect power factor. In this aspect of the invention, means are included for sensing the double rectified input voltage waveform. The output of the sensing means is multiplied with the output of the converter's error amplifier to amplitude modulate the error signal generated by the error amplifier to bring the instantaneous inductor-current linearly proportional with the input instantaneous voltage waveform.

Accordingly, it is a object of the present invention to provide a current mode converter having continuously variable slope compensation responsive to loading.

It is another object of the present invention to provide a current mode converter which is operable from an unfiltered power source.

It is another object of the present invention to provide a current mode converter wherein slope compensation is optimized under all load and power supply input voltage conditions.

It is yet another object of the present invention to provide a current mode converter having continuously variable slope compensation which is adapted for operation from an unfiltered power source.

It is another object of the present invention to provide a current mode converter which maintains a nearly perfect power factor under substantially all load conditions.

It is another object of the present invention to provide a current mode converter which maintains a nearly perfect power factor under all power supply input voltage conditions.

It is yet another object of the present invention to provide a current mode converter having continuously variably slope compensation which maintains a nearly perfect power factor when operated from an unfiltered power source.

BRIEF DESCRIPTION OF THE DRAWING

An understanding of this invention may be obtained from the text below and the accompanying drawings in which.

DETAILED DESCRIPTION OF THE INVENTION

Figure 1:
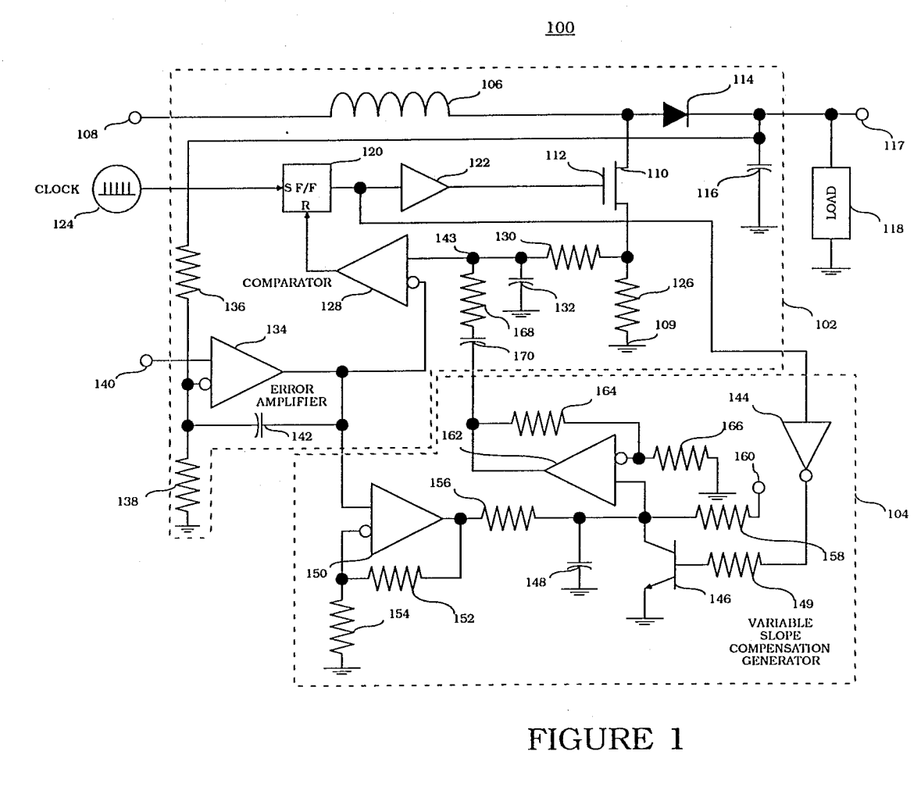
FIG. 1 is a schematic diagram of one embodiment of the present invention which includes continuously variable slope compensation.

One aspect of the present invention is a current mode converter which incorporates a variable slope compensation generator. This invention senses the loading of the converter and adjusts slope compensation to a level optimized for this loading. Referring now to FIG. 1, the present current mode converter 100 includes a current mode converter circuit 102 and a variable slope generator 104. The current mode converter 102 includes an inductor 106 which is coupled to a power supply input terminal 108 at one end. In this embodiment of the invention, the DC input may be filtered by a large electrolitic capacitor (not shown). The other end of inductor 106 is coupled to the drain 110 of a switching transistor 112. The source terminal of switching transistor 112 is coupled to ground terminal 109 via a resistor 126. The drain 110 and inductor 106 are further coupled to the cathode of diode 114. The anode of diode 114 is coupled to output filter capacitor 116 and to converter 100 output terminal 117 and load 118. The switching transistor 112 is controlled by a flip/flop 120 which is coupled to switching transistor 112 through a buffer 122.

In operation, the inductor 106 is periodically energized when switching transistor 112 turns on. During this period, current begins at some minimum level and rises at an approximately linear rate until switching transistor 112 turns off. When switching transistor 112 turns off, the current in the inductor is diverted through diode 114 to capacitor 116 and load 118. Diode 114 prevents the discharging of capacitor 116 during those periods that switching transistor 112 is charging inductor 106. During the periods when inductor 106 is discharging through diode 114, the changing current and corresponding collapsing magnetic flux field of inductor 106 will produce a voltage which appears across inductor 106. Capacitor 116 is chosen to be suitably large so that it maintains this voltage level across load 118 during the periods when inductor 106 is charging.

As noted above, the inductor charging cycle is initiated when the output of flip/flop 120 goes high. This is effected by clock 124, which is coupled to the set input of flip/flop 120. Thus, the output of flip/flop 120 is set high (and transistor 112 turned on) once every clock cycle of clock 124.

The inductor charging cycle is terminated whenever the peak current in the inductor reaches a predetermined level. A current sensing resistor 126 is coupled between the source of switching transistor 112 and ground so that the voltage appearing across current sensing resistor 126 is directly related to current flowing through inductor 106 when the switching transistor 112 is on. The common connection of current sensing resistor 126 and switching transistor 112 is coupled to the noninverting input of comparator 128 through resistor 130. Capacitor 132 is coupled between the non-inverting input of comparator 128 and ground to improve the operation of the converter in the presence of noise. The switching threshold of comparator 128 is set by the output voltage of error amplifier 134 which is coupled to the inverting input of comparator 128.

The output 117 of the converter 100 is coupled to the inverting input of error amplifier 134 through a voltage divider comprising resistors 136 and 138. The non-inverting input of error amplifier 134 is coupled to a voltage reference source at terminal 140. The output of error amplifier 134 is inversely proportional to the voltage appearing at the output 117 of the converter. Therefore, the switching threshold of comparator 128 will fall, thus triggering comparator 128 at a lower level, as the voltage at the output of the comparator rises. In other words, as the output voltage of the comparator rises to a predetermined threshold, the on-cycle of the converter is terminated, thus the duty cycle is reduced. A compensating capacitor 142 is coupled between the inverting input and the output of error amplifier 134 to set the bandwidth of the error amplifier and thus the response time of the converter 100.

The circuitry described thus far is typical to most current mode converters and without any other modification would function under many conditions. Without any further modifications, the voltage appearing across resistor 126 represents an uncompensated sensed current waveform. The present invention provides an improvement over the prior art with the addition of the variable slope compensation network 104 which generates a variable slope signal which is summed with the uncompensated sensed current signal at node 143 to generate a compensated sensed current waveform which will provide stable operation under all load conditions. The variable slope signal generated by circuit 104 provides only the compensation required for the present load condition. The circuit of FIG. 1 is also adapted for operation from a source of variable voltage DC power as the variable slope signal will also compensate for changing input voltage conditions.

The variable slope compensation network 104 is activated through an inverter 144 which is coupled between the output of flip/flop 120 and a switching transistor 146. A resistor 149 couples the base of transistor 146 to the output of inverter 144. During inductor discharging cycles, the output of flip/flop 120 will be low. Thus, the output of inverter 144 will be high, turning on transistor 146 thereby causing the collector of transistor 146 to be coupled to ground. Under this condition, the variable slope compensation circuit 104 will be disabled. When the inductor charging cycle begins, the output of flip/flop 120 will go high and the output of inverter 144 will go low, thus turning transistor 146 off, and enabling the normal operation of the variable slope compensation circuit 104.

The variable slope signal is a ramp signal generated by the charging of capacitor 148. This charging is controlled by an amplifier 150 which has its non-inverting input coupled to the output of error amplifier 134. A resistor divider, formed by resistors 152 and 154, is coupled between the output of amplifier 150, the inverting input of amplifier 150 and ground. The gain of amplifier 150 is set by resistors 152 and 154 so that its output voltage will be approximately ten times the voltage appearing at its input. The output of amplifier 150 is coupled to capacitor 148 through a resistor 156 to effect the charging of capacitor 148. Charging current for capacitor 148 is provided through resistors 156 and 158. Resistor 158 is coupled between a voltage source at terminal 160 and capacitor 148. While it is possible for capacitor 148 to charge to a voltage as high as the voltage at the output of amplifier 150, it will typically be discharged by transistor 146 before reaching this voltage. Thus, as the voltage at the output of amplifier 150 changes, capacitor 148 will be charged proportionally. Resistor 158 assures a minimum fixed rate charge of capacitor 148 at low FET current levels. Capacitor 148 is completely discharged as soon as the inductor current reaches its predetermined peak level. The voltage waveform appearing across capacitor 148 will be similar to a sawtooth waveform having the same frequency as the signal generated by clock 124.

The voltage waveform generated across capacitor 148 is coupled to the non-inverting input of amplifier 162. Amplifier 162 is a fixed gain amplifier whose gain is set by resistors 164 and 166. Amplifier 162 is set for a desired gain and it buffers capacitor 148 from summing node 143. In most applications, amplifier 162 may be deleted entirely and the circuit 100 will function satisfactorily. The output of amplifier 162 is AC coupled to summing node 142 through a resistor 168 and a capacitor 170. Thus, as the voltage changes at the output of converter 100, a variable slope ramp signal is generated across capacitor 148. This ramp signal has a slope which exceeds the slope of the sensed current signal by more than 50%. The variable slope signal is then summed with the sensed current signal to generate a slope compensated sensed current signal which is then used to control comparator 128 which functions to reset flip/flop 120. The characteristics of the variable slope signal and the generation thereof will be discussed more fully in conjunction with FIGS. 3 and 4.

Figure 2:
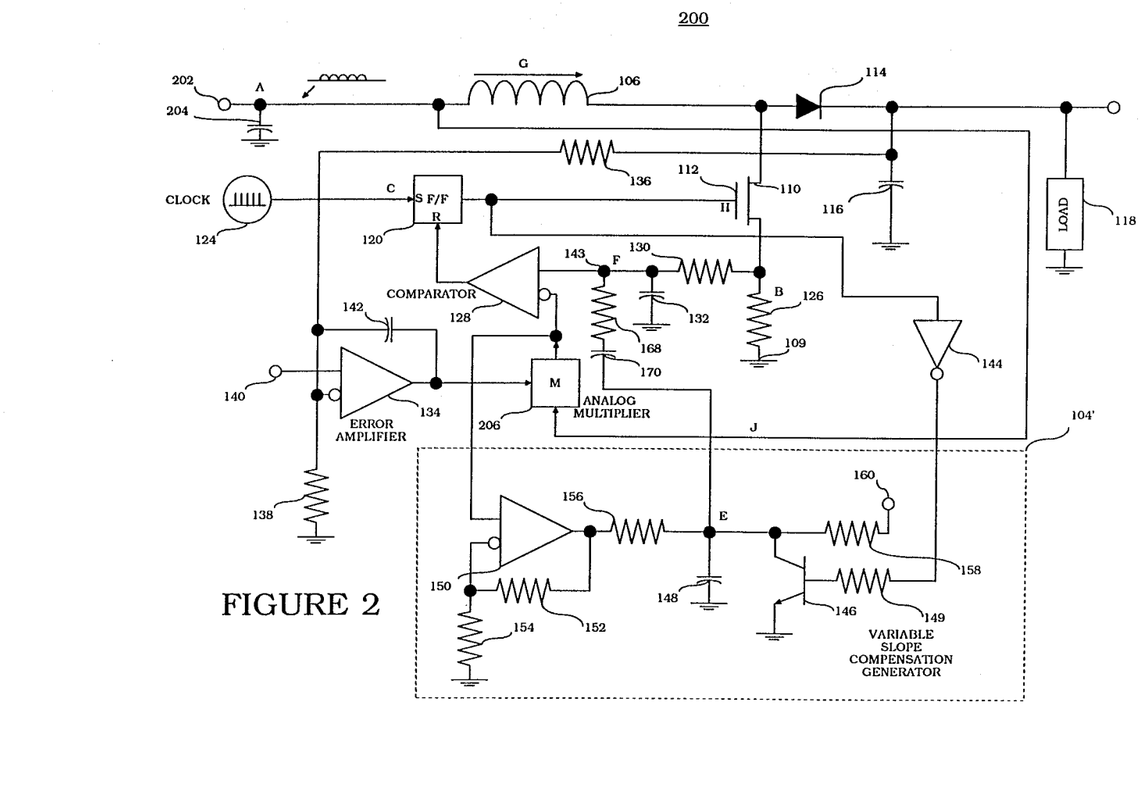
FIG. 2 is a schematic diagram of the preferred embodiment of the present invention which is a current mode converter having a nearly perfect power factor and continuously variable slope compensation.

As noted above, the various embodiments of the present invention are particularly adapted for use with a power source of variable voltage filtered DC. While the circuit 100 operates from such a power source, the preferred embodiment of the present invention further includes means for enabling the circuit to operate with an unfiltered double rectified input at nearly unity power factor. This is achieved in the circuit 200 of FIG. 2 by a multiplier 206 which is inserted between the error amplifier 134 and comparator 128. Note that comparable elements in FIGS. 1 and 2 are identified with the same number for clarity. One input of multiplier 206 is coupled to the source of unsmoothed DC at terminal 202. A small capacitor 204 is provided at the terminal to filter unwanted radio frequency interference. Capacitor 204 is much too small to have any effect on the low frequency variations of the unsmoothed DC. As mentioned above, this provides a more reliable circuit compared to conventional circuits which use large electrolytic filter capacitors.

The other input of multiplier 206 is coupled to the output of error amplifier 134. The output of multiplier 206 is coupled to the inverting input of comparator 128. Thus, the output of multiplier 206 comprises a composite error voltage which will be the product of the present power supply input voltage and the present error amplifier output voltage. The multiplier 206 therefore provides a composite error voltage which will always be proportional with the unsmoothed DC input voltage.

Figure 3:
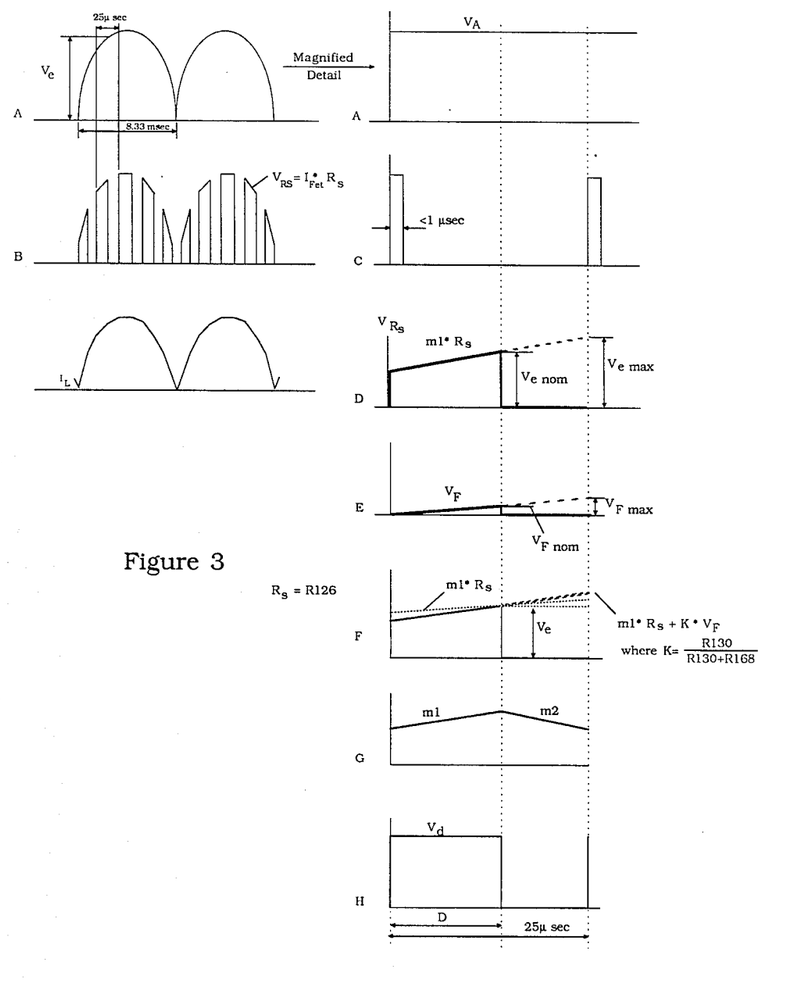
FIG. 3 is a series of graphs used to explain the operation of the circuit of FIG. 2.
Figure 5:
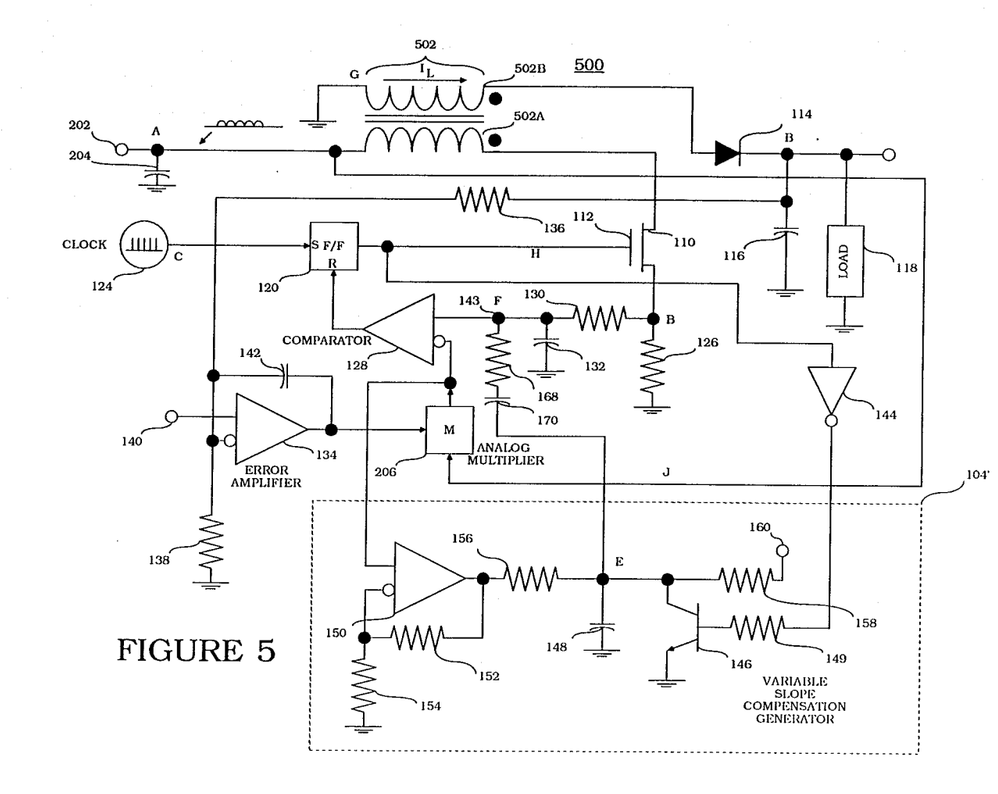
FIG. 5 is a schematic diagram of a modification of the circuit of FIG. 2 which is particularly useful in applications which require an isolated converter output.

The operation of converter 200 may be more clearly understood by reference to FIG. 3. In the following description of FIG. 3, the alphabetic designation adjacent to each of the graphs corresponds to an identical alphabetic designation in FIGS. 2 and/or 5. Graph A (left), is a representation of the unsmoothed DC power supply waveform appearing at terminal 202. Graph A (right) is an expanded view of Graph A (left). This waveform is derived from a standard 60 cycle power source and is full wave rectified to provide a positive sinusoidal signal of 120 Hz. The clock 124 generates a signal of, e.g., approximately 40 KHz, and therefore one cycle of operation of converter 200 corresponds to a 25 microsecond sample of waveform A as detailed on the right.

Graph B (left) is a depiction of current flow through inductor 106 during those periods when the switching transistor is conducting. Graph B is a voltage waveform which is generated across sensing resistor 126 and is directly related to the current flowing through FET 112. An inductor charging cycle is initiated once every 25 microseconds wherein the inductor current reaches a maximum level which is proportional with the voltage appearing at terminal 202. The current flowing in inductor 106 is controlled in part by multiplier 206 to have the same envelope as the voltage appearing at terminal 202.

Graphs A–H on the right depict the operation of the circuit 200 during a single converter clock cycle. The clock pulse is represented in graph C. Graph D is an expansion of the graph appearing in graph B and representing the current flowing through resistor 126 during one clock cycle. As seen in graph D, current flow begins at some minimum level and rises at an approximately linear rate until the charging cycle is terminated. The charging and discharging cycles are controlled by flip/flop 120. The output of flip/flop 120 is represented by graph H. During the charging and discharging cycles, the current flow in the inductor 106 will rise at an approximately linear rate until it reaches its maximum when the charging cycle is terminated. After this charging cycle, the stored energy in inductor 106 will discharge as current to the load and the current will decrease in an approximately linear fashion. The charging and discharging cycles of the inductor for one clock cycle are represented in graph G.

Graphs E and F demonstrate the relationship of the variable slope compensation signal and the sensed current signal employed by converter 200. Specifically, when the inductor charging cycle begins, switching transistor 112 turns on. The resulting inductor current forces a voltage to appear across resistor 126 which is designated $M_1 * R_s$. This voltage is represented in graph D. Assuming the error amplifier 134 feedback loop is in regulation, the output of slope compensation generator 104 is coupled to junction 143. The composite voltage is represented in graph F.

The purpose of the multiplier 206 is to change the DC error amplifier output voltage from DC to a value which is proportional to the input DC voltage waveform at terminal 202. This will force the 40 KHz switching transistor peak currents to have an envelope which is shown in graph B. Accordingly, converter 200 will appear as a resistive load which has a unity power factor. This embodiment of the invention includes a variable slope compensation generator 104' which is a slight modification of the variable slope compensation generator 104 of FIG. 1. As in the case of the circuit 100, the variable slope compensation generator 104' outputs a signal which is linearly proportional to the voltage appearing at the input 202 of converter 200. A substantially linear ramp is generated across capacitor 148. This waveform is demonstrated in graph E. This voltage is divided by the voltage divider formed by resistors 130 and 168 and the result is added to the voltage appearing across resistor 126, represented in graph D, to generate the composite waveform represented by graph F at the summing node 143. The resulting waveform will have a composite slope of:

$$(M_1 \times R_s + K \times V_f)$$

wherein $M_1$ is the multiplication factor of analog multiplier 206, $R_s$ is the resistance of resistor 126, K is $R168/(R168+R130)$ and $V_f$ is the voltage appearing across capacitor 148 represented in graph E.

Figure 4:
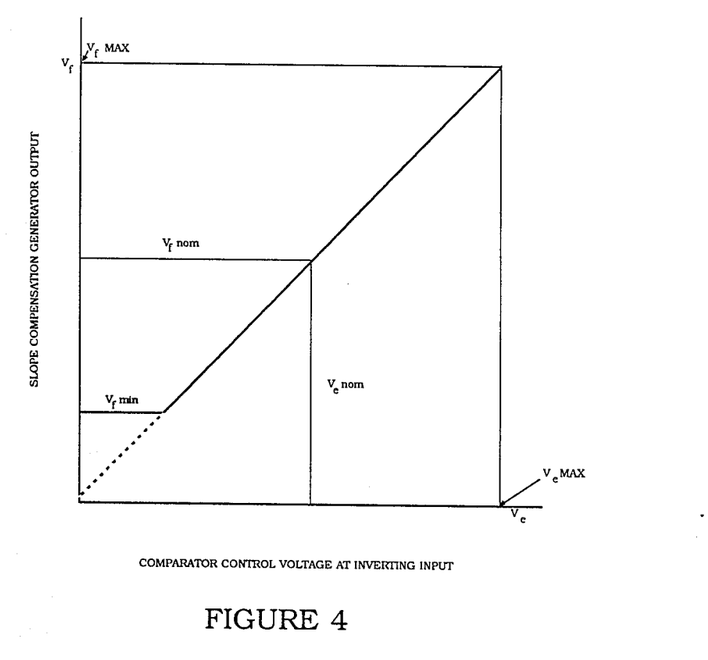
FIG. 4 is a graph depicting the magnitude of slope compensation employed in the preferred embodiment of this invention.

Referring now to FIG. 4, illustrated is a graph representing the slope compensation generator 104' output versus the comparator 128 control voltage. As noted above, Holland and others have demonstrated that the slope of the compensation ramp signal must be greater than one half of the slope of the sensed current waveform, which is the known worst case design for up to a 100% duty cycle. Prior teachings have shown that the downslope of the current waveform for a fixed slope ramp is:

$$M2 = -(V_O/L)$$

(At the inverting input terminal of comparator 128 or $M2 = +(V_O/L)$ at the noninverting input as is the case with the present invention.

This equation is derived based on the assumption that the input voltage $V_O$ is constant. However, in the case of the present invention, the input voltage may not be constant. That is, it may be a full wave rectified sine wave. Further, in the case of the present invention, the duty cycle of the converter is not constant but rather it is changing nonlinearly with the envelope of the input voltage and with the voltage appearing across load 118. Furthermore, in most inductors the inductance is not constant but rather changes nonlinearly with inductor current for most inductor core materials. Given the above factors, deriving a mathematical solution for the correct amount of slope compensation is extremely complicated. However, experiments have demonstrated that the required slope compensation in the case of the present invention is linearly proportional to the peak of the switching transistor current, which is linearly proportional to the control voltage generated at the inverting input of comparator 128. This linear relationship is shown in FIG. 4. At very low switching transistor currents and control voltages, due to typically noisy switching mode power supply environments, it has been discovered that the slope compensation cannot be decreased linearly at error voltages less than 200 millivolts. This is demonstrated by the portion of the graph of FIG. 4 which is parallel to the horizontal axis of the control voltage.

Since the graph shown in FIG. 4 was experimentally derived, it is accurate only for a given set of operating conditions. Those skilled in the art will appreciate that the scale of the graph may change depending on whether the current mode converter is operated in a relatively higher power or relatively lower power mode.

Referring now to FIG. 5, there is shown a schematic diagram 500 of a modification of the circuit 200 which provides an isolated converter output. The modification comprises substituting a two winding coupled inductor 502 in place of the inductor 106. The operation of circuits 200 and 500 is generally identical. However, instead of the conventional inductor 106 a primary winding 502A of an inductor 502 is inserted in its place. The output diode 114 is then coupled to a secondary winding 502B of inductor 502. The other terminal of the secondary winding 502B is coupled to ground. The primary and secondary 502A and 502B of coupled inductor 502 are configured so that the current flow in each of these inductors has the same polarity. That is, current flow in the secondary winding 502B is in the same direction as current flow in the primary winding 502A.

Figure 6:
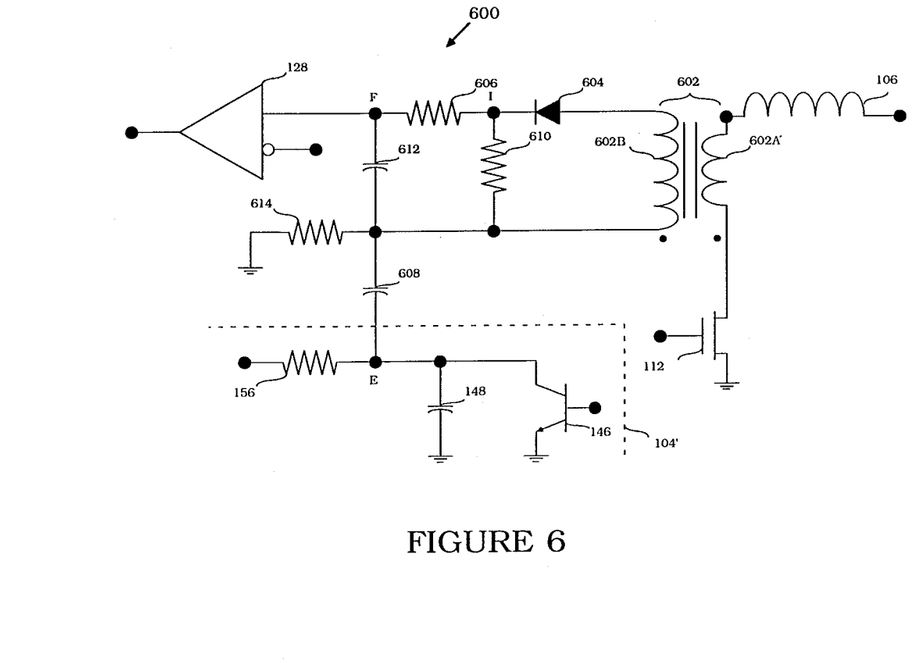
FIG. 6 is a schematic diagram of a circuit which may be used to combine the sensed current signal and slope compensation signal in high power applications.

The circuits described above provide a vast improvement over prior known converters in most applications. In applications where very high currents are flowing through the inductor, however, it may not be practical to employ a resistor, such as resistor 126, to sense the current flowing therein. FIG. 6 is a schematic diagram of a modification for the above circuits that provide current sensing for high power applications.

The modification includes the substitution of resistor 126 with a small current sense transformer 602. The primary winding 602A of transformer 602 is inserted in series between the inductors 106 and the drain of switching transistor 112. The secondary winding 602B of transformer 602 is coupled to a network including a diode 604 coupled in series with resistors 606 and 610. One terminal of resistor 606 is coupled to the noninverting input of comparator 128. The output of the variable slope compensation generator 104 is coupled to this network through a capacitor 608 which is coupled to the opposite terminal of the secondary winding 602B. A resistor 610 is coupled between the common connection of resistor 606 and diode 604 and the common connection of capacitor 608 and transformer secondary 602. Noise filtering is provided by capacitor 612. A bias resistor 614 is coupled between the common terminal of secondary winding 602B and capacitor 608 and ground.

In operation, the charging current in primary winding 602A causes a corresponding current to flow in secondary winding 602B and generates a current sensed voltage across resister 610. This voltage is filtered by the resistor 606 and capacitor 612 before application to comparator 128. Since the secondary winding 602B floats with respect to ground, this voltage is summed with the voltage appearing at capacitor 148.

From the foregoing, an improved variable slope compensation current mode converter has been described. The present converter includes means for sensing the output voltage of the converter and generating a variable ramp compensation signal related thereto. This variable ramp compensation signal is summed with the conventional sensed current signal of the converter to generate a composite sense current signal having variable slope compensation. In addition, means are provided for sensing the instantaneous voltages appearing at the input to the converter and causing the current mode converter to operate in a unity power factor manner. Accordingly, other uses and modifications will be apparent to a person of ordinary skill in the art and all of such modifications are intended to be within the scope of the appended claims.

What is claimed is:

1. An improved current mode converter comprising: a power source; an inductor coupled to said power source; a switching means coupled to said inductor and responsive to a control signal for periodically switching said inductor between charging and discharging modes and for causing a current to flow in said inductor during said charging mode; means coupled to said inductor for coupling the current from said inductor to a load during said discharging mode; control means for generating said control signal including current sensing means coupled to said inductor for sensing the magnitude and slope of current flow in said inductor and for generating a sensed current signal; clock means for generating a clock signal; means for generating an error voltage related to the output voltage of said converter; continuously variable slope compensation means for generating a continuously variable slope compensation signal as a function of the loading of said converter;

combining means for combining said sensed current signal and said continuously variable slope compensation signal and for generating a compensated sensed current signal responsive thereto; and means responsive to said control signal for causing said charging mode to be entered once every cycle of said clock signal and for causing said discharging mode to be entered whenever said compensated sensed current signal exceeds a predefined relationship with respect to said error voltage; and wherein said continuously variable slope compensation means comprises:

amplifier means coupled to the output of said error amplifier of said current mode converter for producing an output voltage which is proportional to the output voltage of said error amplifier;

capacitor means coupled to the output of said amplifier means wherein a ramp signal is developed across said capacitor which is related to the output voltage of said amplifier means;

enabling means coupled to said capacitor means and the output of said means responsive to said control signal, said enabling means for discharging said capacitor during said discharging mode and enabling said capacitor to charge during said charging mode; and buffer amplifier means having an output wherein said buffer means is coupled to said capacitor means and the output of said buffer means comprises said continuously variable slope compensation generator.

2. An improved current mode converter comprising: a power source; an inductor coupled to said power source; a switching means coupled to said inductor and responsive to a control signal for periodically switching said inductor between charging and discharging modes and for causing a current to flow in said inductor during said charging mode; means coupled to said inductor for coupling the current from said inductor to a load during said discharging mode; control means for generating said control signal including current sensing means coupled to said inductor for sensing the magnitude and slope of current flow in said inductor and for generating a sensed current signal; clock means for generating a clock signal; means for generating an error voltage related to the output of said converter; continuously variable slope compensation means for generating a continuously variable slope compensation signal as a function of the loading of said converter; combining means for combining said sensed current signal and said continuously variable slope compensation signal and for generating a compensated sensed current signal responsive thereto; and means responsive to said control signal for causing said charging mode to be entered once every cycle of said clock signal and for causing said discharging mode to be entered whenever said compensated sensed current signal exceeds a predefined relationship with respect to said error voltage; and wherein said continuously variable slope compensation generator comprises:

amplifier means coupled to the output of said error amplifier means of said current mode converter for producing an output voltage which is proportional to the output voltage of said error amplifier;

capacitor means coupled to the output of said amplifier means wherein a ramp signal is developed across said capacitor which is related to the output voltage of said amplifier means wherein the voltage developed across said capacitor comprises said continuously variable slope compensation signal; and enabling means coupled to said capacitor means and the output of said means responsive to said control signal said enabling means for discharging said capacitor during said discharging mode and enabling said capacitor to charge during said charging mode.

3. An improved current mode converter comprising: a power source; an inductor coupled to said power source; a switching means coupled to said instructor and responsive to a control signal for periodically switching said inductor between charging and discharging modes and for causing a current to flow in said inductor during said charging mode; means coupled to said inductor for coupling the current from said inductor to a load during said discharging mode; control means for generating said control signal including current sensing means coupled to said inductor for sensing the magnitude and slope of current flow in said inductor and for generating a sensed current signal; clock means for generating a clock signal; means for generating an error voltage related to the output voltage of said converter; continuously variable slope compensation means for generating a continuously variable slope compensation signal as a function of the loading of said converter; combining means for combining said sensed current signal and said continuously variable slope compensation signal and for generating a compensated sensed current signal responsive thereto; and means responsive to said control signal for causing said charging mode to be entered once every cycle of said clock signal and for causing said discharging mode to be entered whenever said compensated sensed current signal exceeds a predefined relationship with respect to said error voltage; and wherein said current sensing means comprises:

a two winding inductor means having first and second windings wherein said first winding is coupled in series with said switching means and said inductor means of said current mode converter;

a ground reference terminal;

diode means wherein the anode of said diode means is coupled to a first end of said second winding of said two winding inductor;

a first resistor means coupled between said ground reference terminal and the second end of said second winding of said two winding inductor;

a second resistor means coupled between the common connection of said first resistor means and the second end of said second winding of said two winding inductor and the cathode of said diode means;

a third resistor means wherein one end of said resistor means is coupled to the common connection of said first resistor means and said diode means;

means for coupling said continuously variable slope compensation signal to the common connection of said second resistor means and said two winding inductor means; and capacitor means coupled between the other end of said third resistor means and the common connection of said second resistor means and said two winding inductor means wherein the signal appearing at the common connection of said capacitor means and said third resistor means comprises said compensated sensed signal.

4. An improved current mode converter comprising: a power source, an inductor coupled to said power source, a switching means coupled to said inductor and responsive to a control signal for periodically switching said inductor between charging and discharging modes and for causing a current to flow in said inductor during said charging mode, means coupled to said inductor for coupling the current from said inductor to a load during said discharging mode, control means for generating said control signal including current sensing means coupled to said inductor for sensing the magnitude and slope of current flow in said inductor and for generating a sensed current signal, clock means for generating a clock signal, means for generating an error voltage related to the output voltage of said converter, multiplier means having one input coupled to said error amplifier and another input coupled to said power source, for generating an output comprising a composite error voltage; continuously variable slope compensation means for generating a continuously variable slope compensation signal based on the input voltage and the loading of said converter, and combining means for combining said sensed current signal and said continuously variable slope compensation signal and for generating a compensated sensed current signal responsive thereto, and means responsive to said control signal for causing said charging mode to be entered once every cycle of said clock signal and for causing said discharging mode to be entered whenever said compensated sensed current signal exceeds a predefined relationship with respect to said composite error voltage.

5. The apparatus of claim 4 wherein said switching means is a transistor.

6. The apparatus of claim 4 wherein said control means further includes a flip-flop coupled to a comparator having a normally low output said comparator for comparing said compensated sensed current signal and said error voltage wherein said comparator generates a high output whenever the compensated sensed signal voltage exceeds said error voltage and further wherein said high output of said comparator sets said flip-flop, to produce a high output.

7. The apparatus of claim 4 further including filter means coupled to said means coupled to said inductor for coupling the current from said inductor to a load during said discharging mode wherein said filter means filters the output voltage of said current mode converter.

8. The apparatus of claim 4 wherein said filter means is a capacitor.

9. The apparatus of claim 4 wherein said means coupled to said inductor for coupling the current from said inductor to a load during said discharging mode is a diode.

10. The apparatus of claim 4 wherein said inductor means is a single winding inductor.

11. The apparatus of claim 4 wherein said inductor means is an inductor having first and second windings wherein said first winding is coupled between said power supply and said switching means and said second winding is coupled between ground and said coupling means and further wherein said first and second windings are arranged to have the same polarity.

12. The apparatus of claim 4 wherein said continuously variable slope compensation means comprises:
amplifier means coupled to the output of said error amplifier of said current mode converter for producing an output voltage which is proportional to the output voltage of said error amplifier;
capacitor means coupled to the output of said amplifier means wherein a ramp signal is developed across said capacitor which is related to the output voltage of said amplifier means;
enabling means coupled to said capacitor means and the output of said means responsive to said control signal said enabling means for discharging said capacitor during said discharging mode and enabling said capacitor to charge during said charging mode; and
buffer amplifier means having an output wherein said buffer means is coupled to said capacitor means and the output of said buffer means comprises said contiously variable slope compensation signal.

13. The apparatus of claim 4 wherein said continuously variable slope compensation generator comprises:
amplifier means coupled to the output of said error amplifier means of said current mode converter for producing an output voltage which is proportional to the output voltage of said error amplifier;
capacitor means coupled to the output of said amplifier means wherein a ramp signal is developed across said capacitor which is related to the output voltage of said amplifier means wherein the voltage developed across said capacitor comprises said continuously variable slope compensation signal; and
enabling means coupled to said capacitor means and the output of said means responsive to said control signal said enabling means for discharging said capacitor during said discharging mode and enabling said capacitor to charge during said charging mode.

14. The apparatus of claim 4 wherein said current sensing means is a resistor.

15. The apparatus of claim 4 wherein said current sensing means comprises:
a two winding inductor means having first and second windings wherein said first winding is coupled in series with said switching means and said inductor means of said current mode converter;
coupling means coupled to said inductor for coupling the signal generated across said second winding of said two winding inductor to an output; and
means for coupling said continuously variable slope compensation signal to said coupling means wherein the output of said coupling means comprises said compensated sensed current signal.

16. The apparatus of claim 4 wherein said current sensing means comprises:
a two winding inductor means having first and second windings wherein said first winding is coupled tin series with said switching means and said inductor means of said current mode converter;
a ground reference terminal;
diode means wherein the anode of said diode means is coupled to a first end of said second winding of said two winding inductor;
a first resistor means coupled between said ground reference terminal and the second end of said second winding of said two winding inductor;
a second resistor means coupled between the common connection of said first resistor means and the second end of said second winding of said two winding inductor and the cathode of said diode means;
a third resistor means wherein one end of said resistor means is coupled to the common connection of said first resistor means and said diode means;
means for coupling said continuously variable slope compensation signal to the common connection of second resistor means and said two winding inductor means; and
capacitor means coupled between the other end of said third resistor means and the common connection of said second resistor means and said two winding inductor means wherein the signal appearing at the common connection of said capacitor means and said third resistor means comprises said compensated sensed signal.

17. The apparatus of claim 4 wherein said multiplier means is an analog multiplier having two inputs wherein said analog multiplier produces an output which is proportional to the voltage appearing at its respective inputs.

18. An improved current mode converter comprising:

(a) an input terminal;
(b) an output terminal;
(c) an inductor coupled to said power supply input terminal;
(d) switching means coupled to said inductor for periodically generating a conductive path between said inductor and a source of energy;
(e) current sensing means for sensing the magnitude and slope of current flow through said inductor and for generating a sensed current signal;
(f) variable rap generator means coupled to said output terminal for sensing the loading of said converter and generating a variable ramp signal in response thereto;
(g) combining means for combining said sensed current signal and said variable ramp signal and generating a combined signal;
(h) error amplifier means for generating an error voltage related to the voltage at the output of said converter;
(i) multiplier means having one input coupled to said error amplifier and another input coupled to said input terminal for generating a composite error voltage;
(j) control means coupled to said switching means for removing said conductive path whenever said composite error voltage and said combined signal are in a predefined relationship; and
(k) means coupled to said inductor for coupling current from said inductor to said output terminal whenever said control means removes said conductive path.

* * * * *

UNITED STATES PATENT AND TRADEMARK OFFICE
CERTIFICATE OF CORRECTION

PATENT NO. : 4,837,495
DATED : June 6, 1989
INVENTOR(S) : Zoltan Zansky

It is certified that error appears in the above-identified patent and that said Letters Patent is hereby corrected as shown below:

Column 11, line 56, delete "instructor" and insert therefor --inductor--.

Column 15, line 16, delete "rap" and insert therefor --ramp--.

Column 14, line 36, delete "tin" and insert therefor --in--.

Signed and Sealed this

Twenty-fifth Day of February, 1992

Attest:

HARRY F. MANBECK, JR.

*Attesting Officer*  *Commissioner of Patents and Trademarks*